United States Patent
Gabiniewicz et al.

(10) Patent No.: US 6,769,318 B2
(45) Date of Patent: Aug. 3, 2004

(54) SEAT COMPLETE MEASURING SYSTEM

(75) Inventors: Joseph V. Gabiniewicz, Northville, MI (US); Guenther Braeuner, Farmington Hills, MI (US)

(73) Assignee: Intier Automotive Inc., Newmarket (CA)

(*) Notice: Subject to any disclaimer, the term of this patent is extended or adjusted under 35 U.S.C. 154(b) by 0 days.

(21) Appl. No.: 10/333,425

(22) PCT Filed: Jul. 18, 2001

(86) PCT No.: PCT/US01/22572

§ 371 (c)(1), (2), (4) Date: Jan. 17, 2003

(87) PCT Pub. No.: WO02/06787

PCT Pub. Date: Jan. 24, 2002

(65) Prior Publication Data

US 2004/0123683 A1 Jul. 1, 2004

Related U.S. Application Data

(60) Provisional application No. 60/218,893, filed on Jul. 18, 2000.

(51) Int. Cl.[7] .................................. A47B 97/00
(52) U.S. Cl. ................................................ 73/865.9
(58) Field of Search .................. 73/865.9; 33/600; 297/463.2

(56) References Cited

U.S. PATENT DOCUMENTS

| | | |
|---|---|---|
| 5,373,749 A | 12/1994 | Strand et al. |
| 5,456,019 A | 10/1995 | Dowell et al. |
| 5,529,372 A | 6/1996 | Cohen |
| 5,641,917 A | 6/1997 | Hurite et al. |
| 5,765,910 A | 6/1998 | Larkin et al. |
| 5,812,399 A | 9/1998 | Judic et al. |
| 6,050,835 A | 4/2000 | Henrion et al. |
| 6,078,854 A | 6/2000 | Breed et al. |
| 6,081,757 A | 6/2000 | Breed et al. |
| 6,099,030 A | 8/2000 | Kraft |
| 6,195,603 B1 | 2/2001 | Gauger et al. |

FOREIGN PATENT DOCUMENTS

| | | |
|---|---|---|
| DE | 43 45 095 C 1 | 12/1993 |
| GB | 2 067 760 A | 7/1981 |

*Primary Examiner*—Robert Raevis
(74) *Attorney, Agent, or Firm*—Clark Hill PLC

(57) ABSTRACT

A seat complete measuring system (10) for measuring the efforts and range of travel of any movable component on a seat assembly (12) comprises a seat positioning station (24) for supporting and positioning the seat assembly (12). The seat positioning station (24) includes a planar support platform (26) for fixedly securing and supporting the seat assembly and an indexing mechanism supporting the support platform for rotating platform between one of a plurality of indexing positions. A multi-axis measuring station (46) is supported at a predetermined position adjacent the seat position station (24) for cooperating with the seat assembly (12). The multi-axis measuring station (46) includes a support platform (48) fixedly secured at the predetermined position adjacent the seat positioning station, a first measuring arm movable along an x-axis, a second measuring arm (50) movable along a y-axis, a third measuring arm (56) movable along a z-axis, and a tool arm movable along a rotation r-axis for supporting a tool adapted to engage one of the components of the seat. A controller (60) is operatively coupled to the seat positioning station and the multi-axis measuring station for controlling the stations and generating outputs of the measured efforts and range of travel of one of the movable components on the seat assembly during engagement and manipulation thereof by the multi-axis measuring station while supported and positioned by the seat positioning station in one of the indexing positions.

11 Claims, 7 Drawing Sheets

SEAT COMPLETE MEASURING SYSTEM

This application claims the benefit of Provisional application Ser. No. 60/218,893 filed Jul. 18, 2000.

BACKGROUND OF THE INVENTION

1. Field of Invention

The present invention relates generally to a complete measuring system for a seat assembly of an automotive vehicle.

2. Background of Invention

Automotive vehicles include seat assemblies for supporting occupants within the vehicle. Such seat assemblies include a seat cushion and a seat back coupled to the seat cushion. The seat cushion is fixedly secured to the floor of the vehicle. Often such seat assemblies include various movable components for adjusting the seat assembly to accommodate and improve safety and comfort to the occupant supported by the seat assembly. For example, the seat assembly may include a headrest supported by the seat back and adjustable in a generally vertical up and down direction for occupant safety and comfort. The seat assembly may also includes an adjuster mechanism mounted between the floor of the vehicle and the seat cushion for providing fore and aft adjustment of the seat assembly. Still further, the seat assembly may include a recliner mechanism interconnecting the seat back and seat cushion for providing pivotal movement of the seat back relative to the seat cushion.

These seat components require a certain predetermined force, or effort, for moving and adjusting the component. The seat components also include a predetermined range of movement, or travel, for adjusting the component and accommodating various seat occupants. Therefore, it is often necessary to measure the amount of effort required to operate the various components as well as the length, or distance, of travel defining the range of adjustment of the various components.

Such efforts and travels may be measured manually and individually for each component of the seat assembly. However, it is desirable to measure any seat assembly with any of such variety of components with a complete seat measuring system.

SUMMARY OF THE INVENTION

The present invention relates to a measuring system for measuring the efforts and range of travel of one or more movable components on a seat assembly. The measuring system comprises a seat positioning station for supporting and positioning the seat assembly. The seat positioning assembly includes a support platform for fixedly securing and supporting the seat assembly and an indexing mechanism supporting the support platform for rotating the support platform between one of a plurality of indexing positions. A multi-axis measuring station is supported at a predetermined position adjacent to the seat positioning station for cooperating with the seat assembly supported and positioned by the seat positioning station in one of the indexing positions. The multi-axis measuring station includes a support platform fixedly secured at the predetermined position adjacent the seat positioning station, a first measuring arm coupled to the support platform and movable along a first x-axis, a second measuring arm coupled to the first measuring arm and movable along a second y-axis, a third measuring arm coupled to the second measuring arm and movable along a third z-axis, and a tool arm coupled to the third measuring arm and movable along a rotational r-axis for supporting a tool adapted to engage one of the components of the seat. A controller is operatively coupled to the seat positioning station and the multi-axis measuring station for controlling movement of the stations and generating outputs of the measured efforts and range of travel of one of the movable components on the seat assembly during engagement and manipulation thereof by the multi-axis measuring station while supported and positioned by the seat positioning station in one of the indexing positions.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
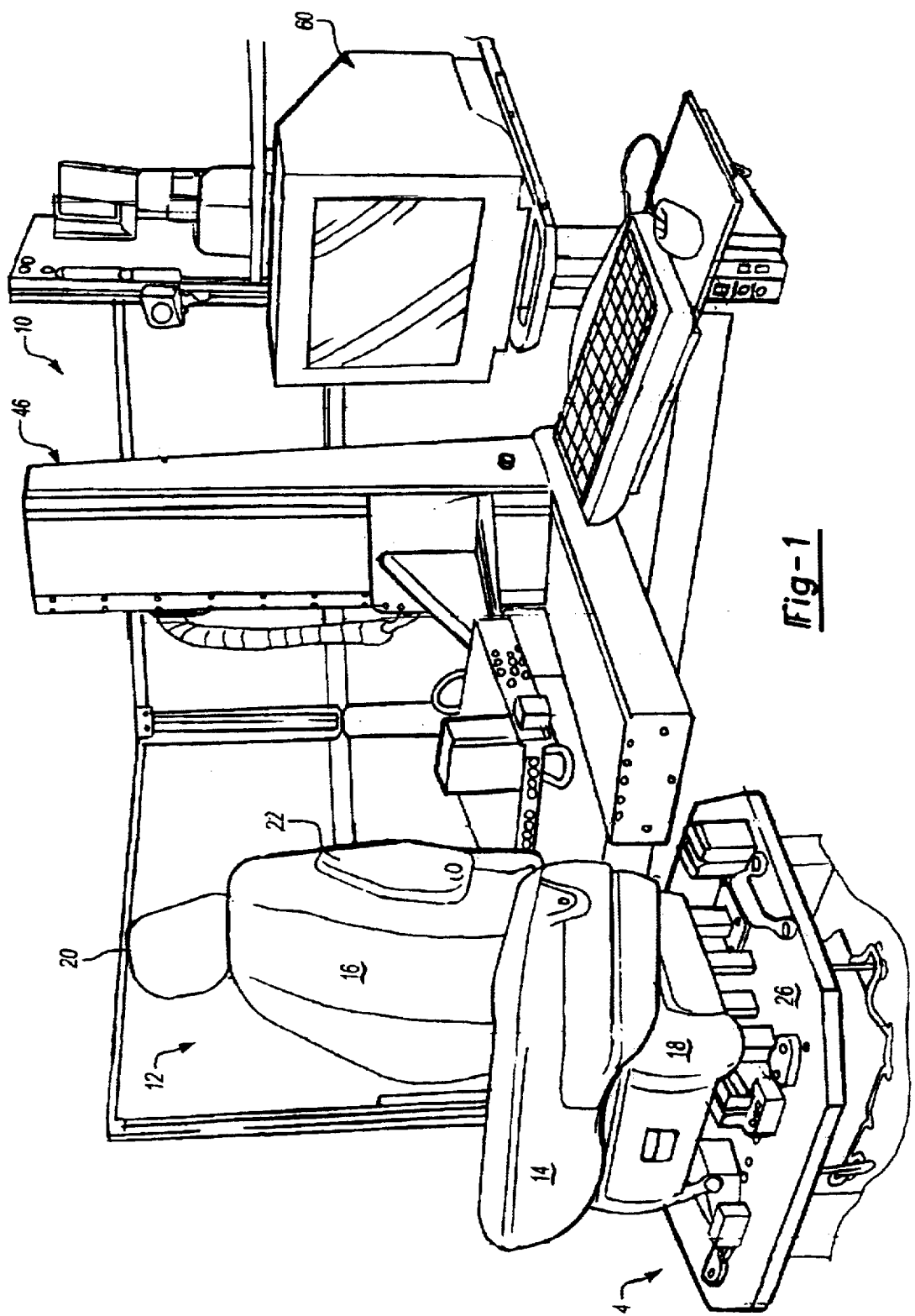
FIG. 1 is a perspective view of a seat complete measuring system according to the present invention.

Referring to FIG. 1, a seat complete measuring system according to the present invention is generally shown at 10. The seat complete measuring system 10 measures the efforts, or force, required to operate a moveable component on an automotive vehicle seat assembly and also measures the travel, or range of movement, of the component. The seat assembly is generally shown at 12 in FIG. 1. The seat assembly 12 includes a seat cushion 14 and seat back 16 coupled to the seat cushion 12. The seat assembly 12 is adapted to be fixedly secured to the vehicle by a riser 18 secured to the bottom of the seat cushion 14. The seat assembly 12 of FIG. 1 includes a plurality of moveable components. Specifically, the seat assembly 12 includes a headrest 20 coupled to the top of the seat back 16 and moveable in a generally vertical, or up and down, direction relative to the seat back 16. The seat assembly 12 also includes an armrest 22 pivotally coupled to the side of the seat back 16 and moveable between an upright stowed position, as shown in FIG. 1, and an extended use position generally perpendicular to the seat back 16. The seat assembly 12 may also include various other movable components, such as seat adjusters, seat back recliners, underseat storage bins, and the like, as are commonly known to one skilled in the art.

Figure 2:
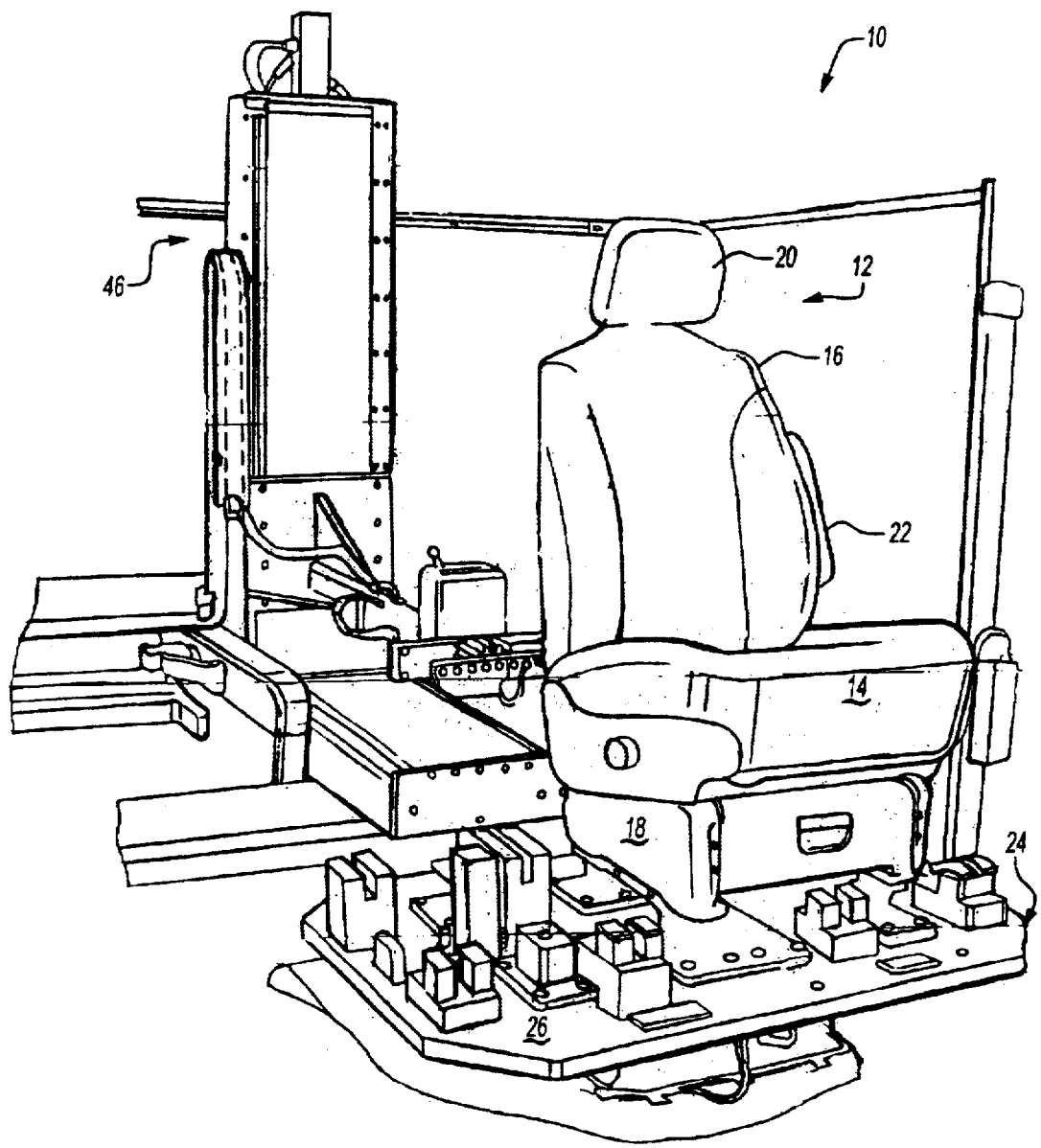
FIG. 2 is another perspective view of the seat complete measuring system.
Figure 3:
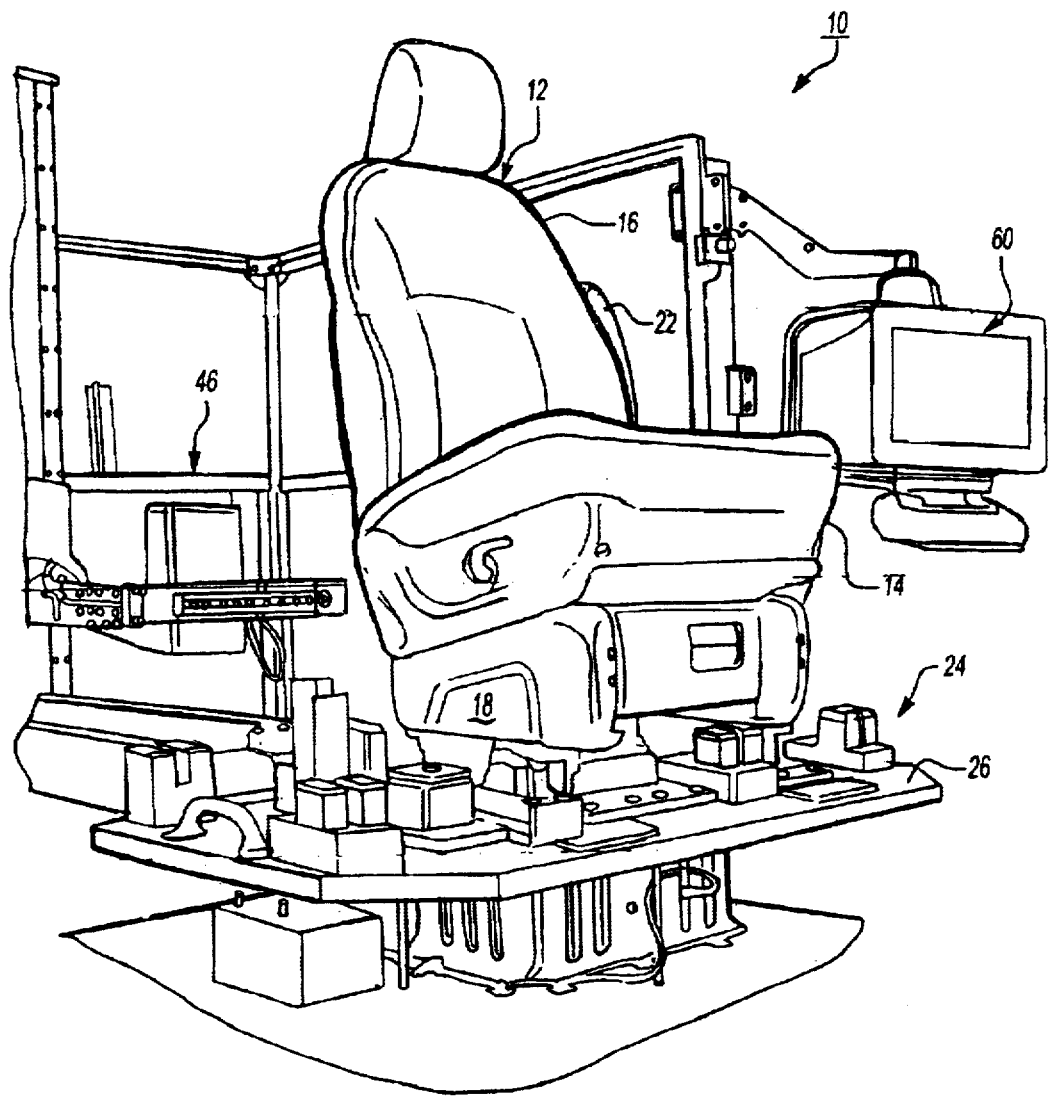
FIG. 3 is a perspective view of a seat positioning station of the seat complete measuring system.

Referring to FIGS. 1, 2 and 3, the seat complete measuring system 10 includes a seat positioning station 24 for supporting and positioning the seat assembly 12. The seat positioning station 24 comprises a support platform, or buck, 26 of a generally planar and rectangular configuration for fixedly securing and supporting the seat assembly 12.

Figure 4:
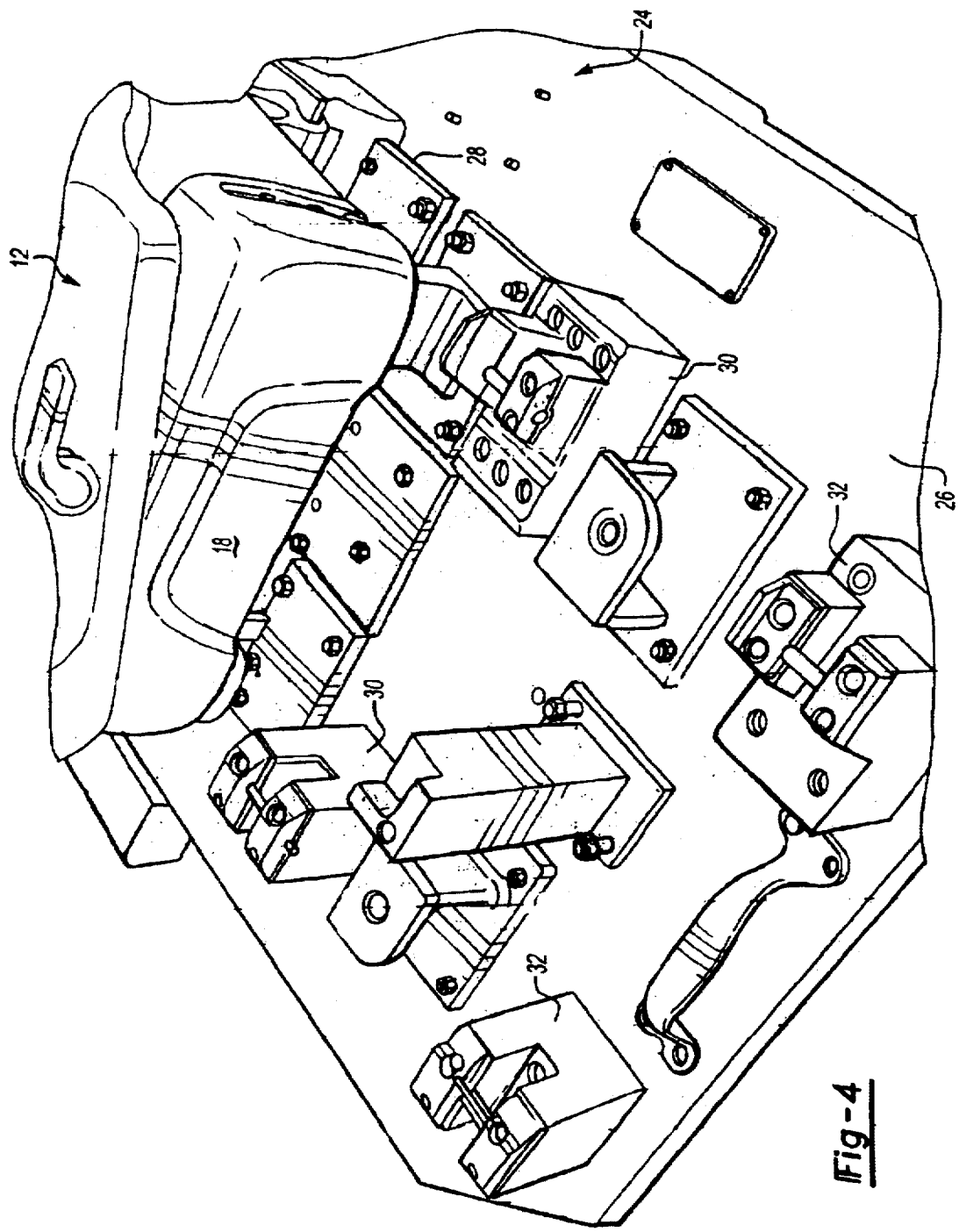
FIG. 4 is a perspective view of a support platform and plurality of seat support fixtures of the seat positioning station.

Referring to FIG. 4, a variety of seat support couplings 28, 30, 32 are fixedly secured to the support platform 26 for receiving and fixedly mounting the seat assembly 12 to the support platform 26. The seat support couplings 28, 30, 32 are positioned at various positions and spacings along the support platform 26 in order to accommodate a variety of configurations of seat assemblies. That is, the seat support couplings 28 are positioned and spaced to receive and mount a bucket-type seat assembly 12 to the support platform 26 as shown. The seat support couplings 30 may be used to receive and mount a wider second row bench-type seat assembly and the seat support couplings 32 may be used to receive and mount an even wider third row bench-type seat assembly to the support platform 26. It should be appreciated, therefore, that any type, size and configuration of seat assembly may be supported and mounted on the support platform 26 by varying the seat support couplings.

Figure 5:
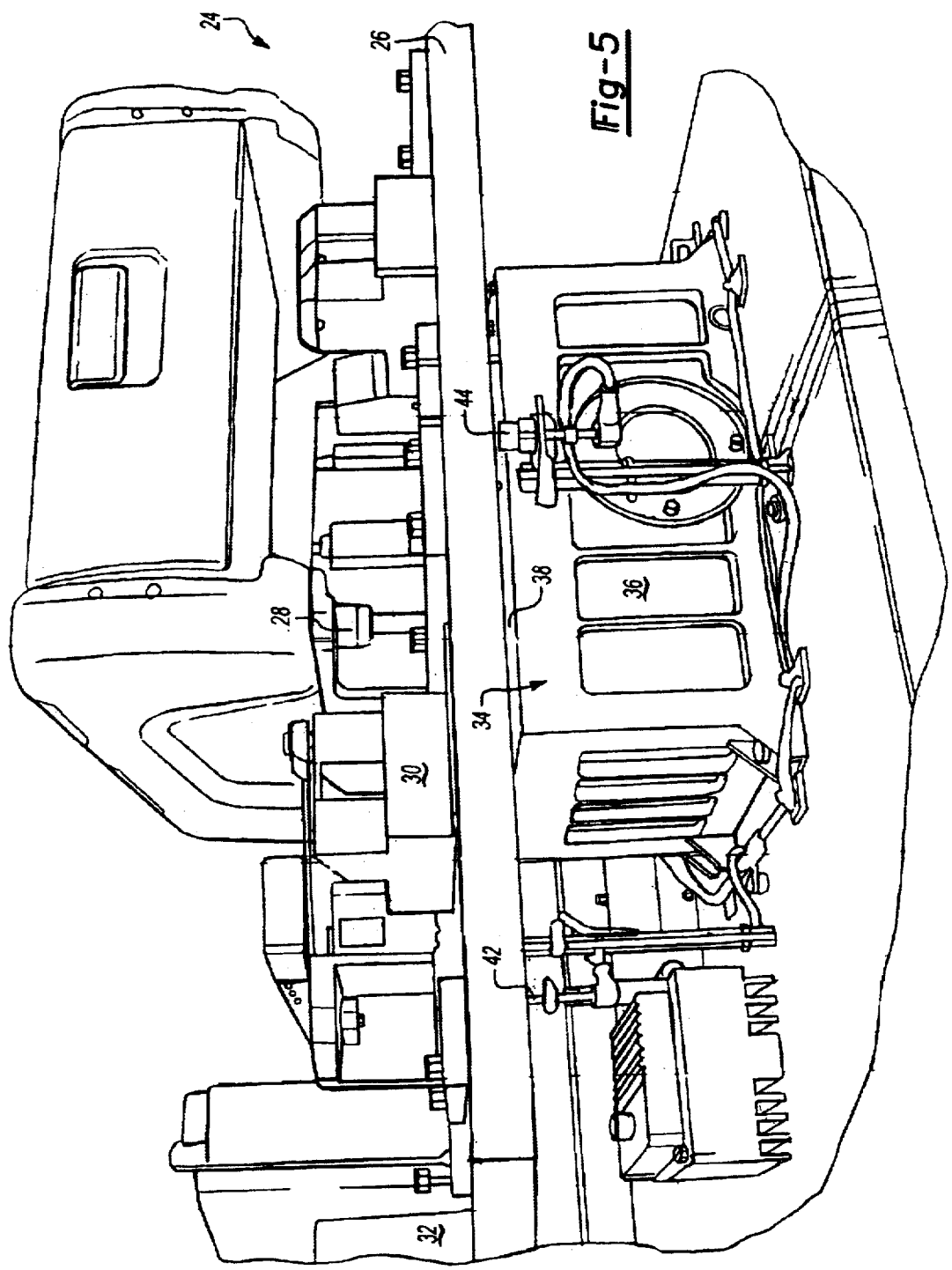
FIG. 5 is a side view of an indexing mechanism of the seat positioning station.
Figure 6:
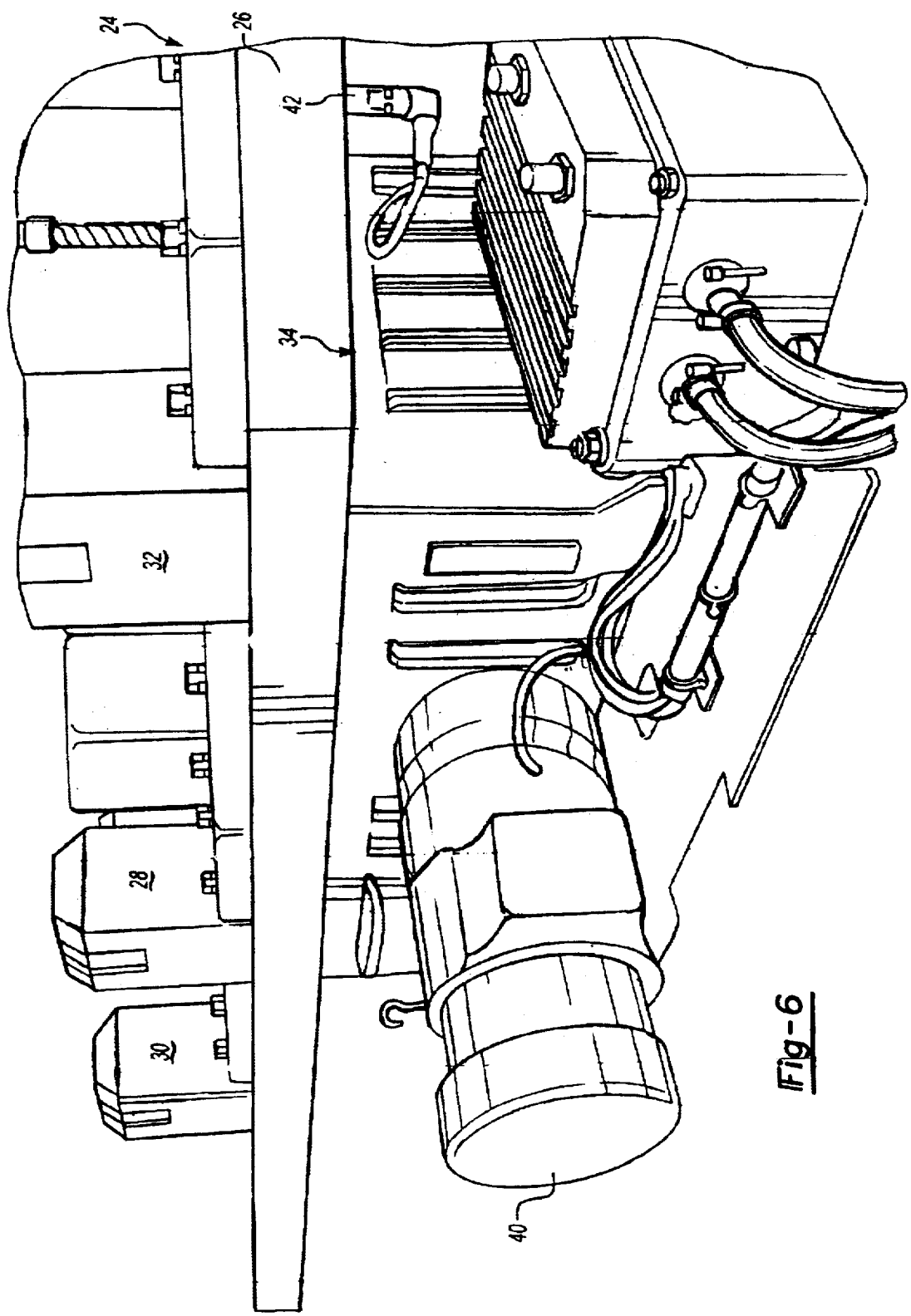
FIG. 6 is another side view of the indexing mechanism.

Referring to FIGS. 5 and 6, the seat positioning station 24 further includes an indexing mechanism 34 supporting the support platform 26 for rotating the support platform 26, and thus the seat assembly 12, between one of a plurality of indexing positions. The indexing mechanism 34 includes housing 36 encasing a rotatable turntable 38. A motor 40 is secured to the housing 36 and coupled to the turntable 38 for rotating the turntable 38 three hundred sixty degrees about a vertical axis. The indexing mechanism 34 further includes a plurality of spaced apart proximity sensors 42, 44 spaced from the housing 36 and seated immediately adjacent to the bottom of the support platform 26 for locating, identifying and defining the indexing positions upon rotation of the turntable 38 and seat assembly 12.

Figure 7:
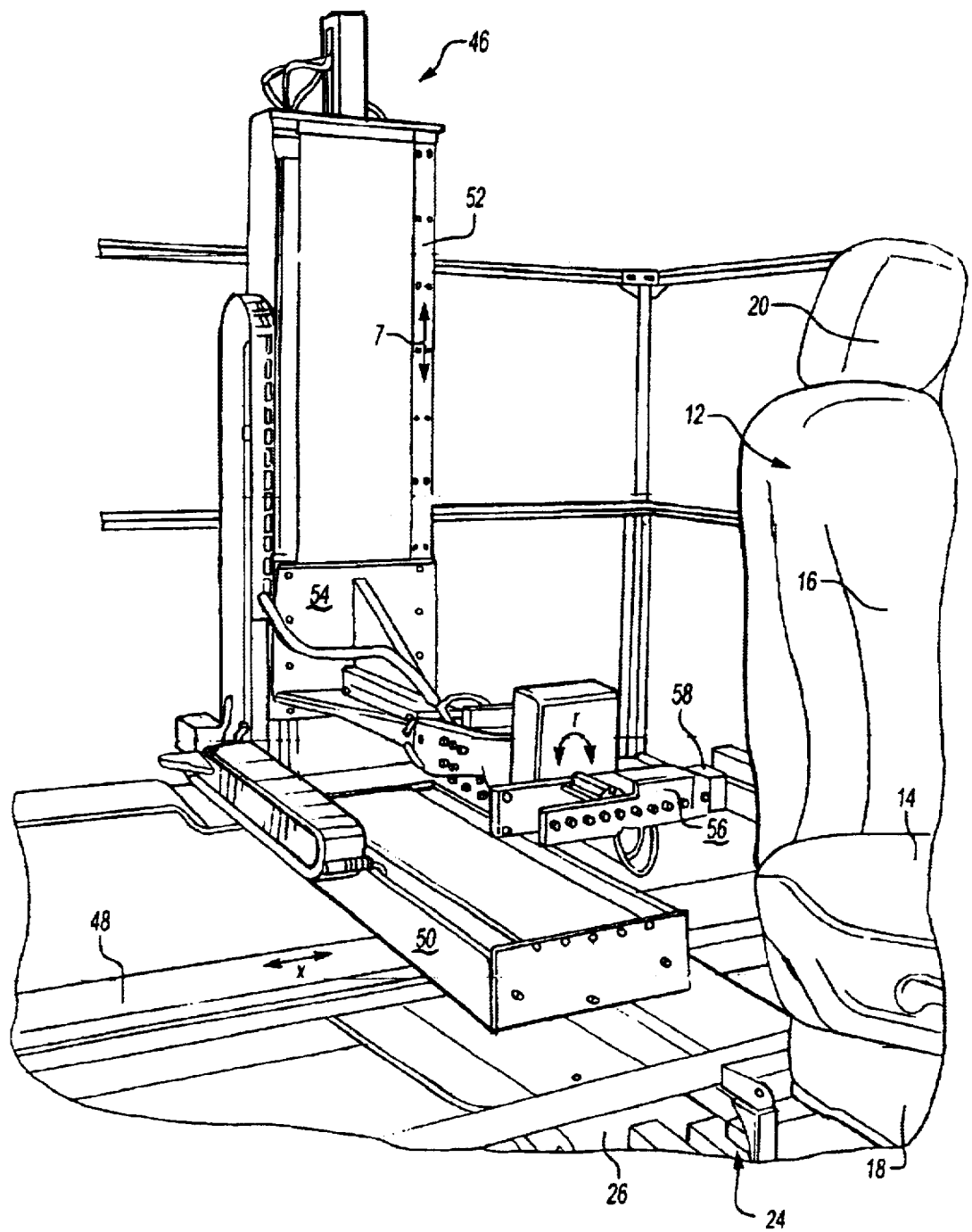
FIG. 7 is a perspective view of a multi-axis measuring station of the seat complete measuring system.

Referring to FIG. 7, the seat complete measuring system 10 further includes a multi-axis measuring station 46. The multi-axis measuring station 46 is supported at a predetermined position adjacent to the seat positioning station 24 for cooperating with the seat assembly 12 supported and positioned by the seat positioning station 24 in one of the indexing positions. The multi-axis measuring station 46 includes a support platform 48 fixedly secured at the predetermined position adjacent the seat position station 24. The support platform 48 may locate, secure and support the measuring station 46 at any desired predetermined position around the perimeter of the seat positioning station 24 and be spaced any desired and predetermined distance therefrom without varying from the scope of the invention. A first measuring arm 50, having an elongated and generally rectangular configuration, is slidably coupled to the support platform 48 and movable along a first x-axis as shown in FIG. 7. A second measuring arm 52, also having an elongated, generally vertical and rectangular configuration, is slidably coupled to the first measuring arm 50 and movable along a second y-axis. The y-axis is generally along the same plane but perpendicular to the x-axis. A third measuring arm 54 is cantilevered from the second measuring arm 52 and slidable along a third z-axis. The z-axis is generally vertical and perpendicular to both the x-axis and y-axis. Finally, a tool arm 56 is rotatably coupled to the distal end of the third measuring arm 54 and movable along a rotational r-axis. The tool arm 56 supports a tool adapted to engage one of the components of the seat assembly 12, such as the headrest 20 or armrest 22. The tool arm 56 includes a proximity and force sensor 58 for measuring the effort, or force, applied to move the seat component and for measuring the travel, or range of motion, of the component.

Referring back to FIG. 1, the seat complete measuring system 10 further includes a controller 60 operatively coupled to the seat positioning station 24 and the multi-axis measuring station 46 for controlling the movement of the seat positioning station 24 between the indexing positions and the movement of the arms 50, 52, 54, and 56 relative to the seat 12. The controller 60 also measures and outputs the efforts and range of travel of the movable component on the seat assembly 12 during engagement and manipulation thereof by the multi-axis measuring station 46 while supported by the seat positioning station 24 in one of the indexing positions. The controller 60 is programmable by software or operable manually such as by a teach pendant.

In operation, any type of seat assembly 12 may be mounted by the seat support couplings 28, 30, 32 and supported by the support platform 26 of the seat positioning station 24. Once it is determined which component of the seat assembly 12 is desired for measuring, the indexing mechanism 34 rotates the support platform 26, and seat, until the sensors 42, 44 locate the support platform 26 in one of the indexing positions with the component facing or adjacent to the tool arm 56 of the multi-axis measuring station 46. An appropriate tool is secured to the tool arm 56 for engaging the component, such as the armrest 22 and the multi-axis measuring station 46 is initialized and programmed to located the tool arm 56 and tool for engagement with the component. The arms 50, 52, 54 and 56 may now automatically manipulate the component throughout its designed range of motion via movement in the x, y, z, and/or r-axes. For example, the multi-axis measuring station 46 may only have to move the headrest 20 vertically along the z-axis by movement of the third measuring arm 54. The proximity and force sensor 58 on the tool arm 56 measures the effort, or force, required to move the component as well as the length of travel, or range of motion, of the component. The sensor 58 outputs the measurements to the controller 60 for interpretation by an operator. The seat complete measuring system 10 allows the operator to determine whether any of the various components of the seat are with acceptable design tolerances of effort and travel.

It should be appreciated that either the seat positioning station 24 or the multi-axis measuring station 46 may include means for providing the movement and positioning of the seat assembly 12 or one of its components in any of the x, y, z, and/or r-axes.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A measuring system for measuring the efforts and range of travel of one or more movable components on a seat assembly, said measuring system comprising:

a seat positioning station for supporting and positioning the seat assembly, said seat positioning station including a support platform for fixedly securing and supporting the seat assembly and an indexing mechanism supporting said support platform for rotating said support platform between one of a plurality of indexing positions;

a multi-axis measuring station supported at a predetermined position adjacent said seat positioning station for cooperating with the seat assembly supported and positioned by said seat positioning station in one of said indexing positions, said multi-axis measuring station including a support platform fixedly secured at said predetermined position adjacent said seat positioning station, a first measuring arm coupled to said support platform and movable along a first x-axis, a second measuring arm coupled to said first measuring arm and movable along a second y-axis, a third measuring arm coupled to said second measuring arm and movable along a third z-axis, and a tool arm coupled to said third measuring arm and movable along a rotational r-axis for supporting a tool adapted to engage one of the components of the seat; and a controller operatively coupled to said seat positioning station and said multi-axis measuring station for controlling the movement of said stations and generating outputs of the measured efforts and range of travel of one of the movable components on the seat assembly during engagement and manipulation thereof by said multi-axis measuring station while supported and positioned by said seat positioning station in one of said indexing positions.

2. A complete measuring system as set forth in claim 1 further including a force sensor coupled to said tool arm for sensing the force required for moving one of the movable components on the seat assembly and a proximity sensor for sensing the range of motion of the movable component.

3. A complete measuring system as set forth in claim 2 wherein said indexing mechanism includes a housing for supporting a rotatable turntable connected to said support platform of said seat positioning station for rotating said seat positioning station between one of said indexing positions.

4. A complete measuring system as set forth in claim 3 wherein said indexing mechanism includes at least one proximity sensor adjacent said support platform of said seat positioning station for locating, identifying and defining said indexing positions upon rotation of said turntable.

5. A complete measuring system as set forth in claim 4 wherein said indexing mechanism includes a motor supported by said housing and coupled to said turntable for selectively rotation said turntable and said support platform between said indexing positions.

6. A complete measuring system as set forth in claim 5 wherein said support platform of said seat positioning station includes a plurality of coupling mounted thereto for receiving and securing the seat assembly to said support platform.

7. A complete measuring system as set forth in claim 6 wherein said first measuring arm includes a generally elongated and horizontal member slidably connected to said support platform of said multi-axis measuring station.

8. A complete measuring system as set forth in claim 7 wherein said second measuring arm includes a generally elongated and vertical member slidably connected to said first measuring arm.

9. A complete measuring system as set forth in claim 8 wherein said third measuring arm includes an elongated member slidably connected to and cantilevered from said second measuring arm and generally parallel to said first measuring arm.

10. A complete measuring system as set forth in claim 9 wherein said third measuring arm includes a distal end rotatably supporting said tool arm.

11. A complete measuring system as set forth in claim 10 further including at least one motor coupled between said multi-axis measuring station and said controller for automatically controlling and moving said measuring arms and said tool arm along said axes in response to said controller.

\* \* \* \* \*

UNITED STATES PATENT AND TRADEMARK OFFICE
Certificate

Patent No. 6,769,318 B2                                                                 Patented: August 3, 2004

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Joseph V. Gabiniewicz, Northville, MI; Guenther Braeuner, Farmington Hills, MI; George H. Ding, Novi, MI; and Nathaniel R. Obudzinski, Belleville, MI.

Signed and Sealed this Twenty-eighth Day of June 2005.

HEZRON E. WILLIAMS
*Supervisory Patent Examiner*
Art Unit 2856